United States Patent [19]
Burger et al.

[11] Patent Number: 5,830,816
[45] Date of Patent: Nov. 3, 1998

[54] SINTERED MOLDING

[75] Inventors: Wolfgang Burger, Plochingen; Stefan Gernsheimer, Könger; Hans Andersch, Heiningen; Kilian Friederich; Siegbert Lehmann, both of Plochingen; Johannes Schneider, Hochdorf; Michael Fripan, Backnang, all of Germany

[73] Assignee: Cerasiv GmbH Innovatives Keramik-Engineering, Plochingen, Germany

[21] Appl. No.: 674,458

[22] Filed: Jul. 2, 1996

Related U.S. Application Data

[63] Continuation of Ser. No. 468,207, Jun. 6, 1995, abandoned, which is a continuation of Ser. No. 344,539, Nov. 3, 1994, abandoned, which is a continuation of Ser. No. 969,802, Oct. 23, 1993, abandoned.

[30] Foreign Application Priority Data

Aug. 6, 1990 [DE] Germany ............... 40 24 877.1
May 16, 1991 [DE] Germany ............... 41 16 008.8

[51] Int. Cl.⁶ ..................................... C04B 35/119
[52] U.S. Cl. ............... 501/105; 501/87; 501/89; 501/98; 501/132
[58] Field of Search ............... 501/105, 87, 89, 501/98, 132

[56] References Cited

U.S. PATENT DOCUMENTS

| | | | |
|---|---|---|---|
| 4,218,253 | 8/1980 | Dworak et al. | 501/97 X |
| 4,316,964 | 2/1982 | Lange | 501/105 |
| 4,331,048 | 5/1982 | Dworak et al. | 501/105 X |
| 4,366,254 | 12/1982 | Rich et al. | 501/89 |
| 4,742,030 | 5/1988 | Masaki et al. | 501/105 |
| 4,770,673 | 9/1988 | Ketcham et al. | 51/309 |
| 4,804,645 | 2/1989 | Ekstrom | 501/105 |
| 4,849,381 | 7/1989 | Brandt et al. | 501/89 |
| 4,920,838 | 5/1990 | Brandt et al. | 82/1.11 |
| 5,002,911 | 3/1991 | Matsumoto et al. | 501/105 |
| 5,008,221 | 4/1991 | Ketcham | 501/103 |
| 5,110,770 | 5/1992 | Brandt et al. | 501/89 |
| 5,183,610 | 2/1993 | Brog et al. | 264/56 |
| 5,188,908 | 2/1993 | Nishiyama et al. | 428/98 |

FOREIGN PATENT DOCUMENTS 8501936  5/1985  WIPO ................. 501/105

*Primary Examiner*—Karl Group
*Attorney, Agent, or Firm*—Felfe & Lynch

[57] ABSTRACT

Zirconium dioxide containing 2 to 40 vol. % of stabilizing oxides is embedded in the matrix material of a sintered molding consisting of an aluminum oxide/chromium oxide mixed crystal. The quantity of stabilizing oxides added is chosen so that the zirconium dioxide is predominantly tetragonal. The molar ratio of the zirconium dioxide containing the stabilizing oxides to the chromium oxide is between 1000:1 and 20:1 and the zirconium dioxide has a maximum particle size of 2 μm.

12 Claims, 6 Drawing Sheets

SINTERED MOLDING

This application is a continuation of application Ser. No. 08/468,207, filed Jun. 6, 1995, now abandoned, which is a continuation of application Ser. No. 08/344,539, filed Nov. 23, 1994, now abandoned, which is a continuation of application Ser. No. 07/969,802, filed Jan. 21, 1993, now abandoned.

In DE-A-36 08 854 there is described the use of an oxide ceramic material for pressing tools for shaping components of glass or vitreous ceramic. Aluminum oxide, chromium oxide, spinel and a mixed oxide of aluminum and chromium [Al, Cr]$_2$O$_3$, not defined as regards its composition in amounts, as well as cubic and tetragonal zirconium dioxide, are given as the matrix materials. The individual proposals for the matrix components are given equal importance side by side, so that no teaching is given as regards the selection of a special matrix component or for the percentage of the amount of zirconium dioxide, for example, to be deposited in the matrix. In addition to the components stated above, stabilizing oxides can also be present, such as yttrium oxide (Y$_2$O$_3$) in the amount of 3.5 to 12, preferably 8 to 10, or magnesium oxide (MgO) in an amount of 6.0 to 16, preferably 8 to 14 mol- %, and cerium oxide (CeO$_2$) in an amount of 3.5 to 12 mol- %, preferably 8 to 10 mol- %, with respect to the oxide ceramic material. As the particle size for the particles embedded in a polycrystalline matrix, a magnitude between 5 and 5000 nm is given, corresponding to 0.005 to 5 $\mu$m.

An additional proposal for a so-called "transformation-toughened" ceramic composition, in which a finely divided solid solution of ZrO$_2$—HfO$_2$ in a solid solution of either aluminum oxide containing chromium oxide or mullite containing chromium oxide, is found in WO 85/01936, where it is proposed for high-temperature applications, such as Diesel engines and gas turbines. The chromium oxide content taken into consideration, which is between 3 and 30 mol- %, especially a content of 20 mol- % of chromium oxide in interaction with a content of 10 to 20 mol- % of hafnium dioxide, is said to serve to improve hardness and for the establishment of a low thermal conductivity. Increasing proportions of chromium oxide and hafnium dioxide lead to a reduction of the thermal conductivity. Marked increases in hardness are found only at relatively high chromium oxide concentrations, of about 20 mol- % with respect to 20 mol- % of HfO$_2$. As for the grain size of the embedded ZrO$_2$—HfO$_2$ phase an order of magnitude of 5 $\mu$m is given in the Examples of this disclosure, and the failure to obtain the tetragonal modification is attributed to the fact that the dispersed ZrO$_2$—HfO$_2$ failed to be obtained in sufficient fineness. The addition of stabilizing oxides is not mentioned in this disclosure. The toughness values achieved are in the range between 5 and about 6.5 MPa $\sqrt{}$ m.

EP-A-1 99,459 relates to ceramic compositions of great toughness and provides for an interaction of zirconium dioxide, partially stabilized zirconium dioxide, zirconium dioxide/hafnium oxide solid solutions, zirconium dioxide/hafnium dioxide partially stabilized solid solutions, and hafnium dioxide with mixtures of metal oxides, especially yttrium niobium oxide (YNbO$_4$) or yttrium tantalum oxide (YTaO$_4$), wherein the yttrium ion of the mixed oxides is also replaced in part by a cation of a rare earth metal, e.g., La$^{+3}$, Ce$^{+4}$, Cd$^{+3}$ Pr$^{+2}$, Tm$^{+3}$. According to an additional variant of this disclosure, the described ceramic alloy, i.e., ZrO$_2$ with the addition of YNbO$_4$ in an amount of at least 5 vol- %, for example, can be mixed with, for example, $\alpha$-aluminum oxide or also Al$_2$O$_3$—Cr$_2$O$_3$, mullite or titanium carbide.

The disadvantage of this known composition is to be seen in the fact that, as a consequence of the mixed oxides containing niobium or tantalum an additional grain boundary phase develops in the ceramic products and a softening point is established which for many applications is still insufficiently high.

In like manner, U.S. Pat. No. 4,770,673 describes a ceramic cutting tool which consists of 20 to 45% of a zirconium dioxide alloy containing 1 to 4 mol- % of a mixed metal oxide, and 55 to 80 wt- % of a hard ceramic composition; the mixed metal oxides consist of the group YNbO$_4$, YTaO$_4$, MNbO$_4$, MTaO$_4$ and mixtures thereof, and M consists of a cation which is provided for the substitution of the yttrium cation and is selected from among Mg$^{+2}$, Ca$^{+2}$, Sc$^{+3}$ and rare earth metal ions consisting of the group La$^{+3}$, Ce$^{+4}$, Ce$^{+3}$, Pr$^{+3}$, Nd$^{+3}$, Sm$^{+3}$, Eu$^{+3}$, Gd$^{+3}$, Tb$^{+3}$, Dy$^{+3}$, Ho$^{+3}$, Er$^{+3}$, Tm$^{+3}$, Yb$^{+3}$ and Lu$^{+3}$ and mixtures thereof. The hard ceramic can be e.g. aluminum oxide, Sialon, SiC, Si$_3$N$_4$, and further Al$_2$O$_3$—Cr$_2$O$_3$ up to a Cr$_2$O$_3$ content of about 5 mol- %. Here, again, there is the disadvantage that an excessively low softening range results from the alloy components in the form of mixed oxides containing niobium or tantalum which are added to the zirconium oxide.

U.S. Pat. No. 4,316,964 relates to a composition, considered also for the production of cutting tool inserts, of 95–5 vol. % of aluminum oxide and 5–95 vol. % of zirconium dioxide with the addition of about 0.5 to 5.5 mol- % of yttrium oxide, 0.5 to 10 mol % of cerium oxide, 0.4 to 4 mol- % of erbium oxide and 0.5 to 5 mol- % of lanthanum oxide, with respect to zirconium dioxide.

A sintered molding designed in accordance with EP A-282,879 for use as a cutting tool insert consists of a matrix containing whiskers, which also contains particles of, for example, silicon carbide, silicon nitride, Sialon, aluminum oxide and zirconium dioxide. The whiskers can consist of the same materials as the particles. Zirconium dioxide is here mentioned in addition to mullite and aluminum oxide as matrix material. Also, the sintered moldings can also contain the usual sintering adjuvants, such as the oxides of magnesium, chromium or yttrium. Of the rare earth oxides, the oxides of lanthanum, samarium, gadolinium, dysprosium, holmium, erbium, thulium, ytterbium and lutetium are mentioned. Toughnesses of more than 10 MPam$^{1/2}$ are cited.

A ceramic of great toughness and wear resistance for use as a metal cutting tool is disclosed in DE-A-35 29 265. The material composition provides for 20 to 50 wt- % of titanium carbide and 18 to 79.9 wt- % of aluminum oxide and 0.1 to 2 wt- % of a sintering adjuvant selected from the group MgO, CaO, SiO$_2$, ZrO$_2$, NiO, Th$_2$O$_3$, AlN, TiO, TiO$_2$, Cr$_2$O$_3$ and/or at least one oxide of the rare earths, Y$_2$O$_3$, Dy$_2$O$_3$, Er$_2$O$_3$, Ho$_2$O$_3$, Gd$_2$O$_3$ and/or Tb$_4$O$_7$. The sintering adjuvants serve to prevent grain growth in aluminum oxide and enter with the latter into a compound which promotes the process of sintering the ceramic.

EP-A-214,291 discloses a sintered molding containing 40 to 99 mol- % of partly stabilized zirconium dioxide and 1 to 60 mol- % of aluminum oxide, and small amounts of the oxides of Mn, Fe, Co, Ni, Cu and Zn as sintering adjuvants to accelerate the sintering process. To establish a tetragonal phase content of 65% or more the oxides of yttrium, magnesium, calcium or cerium are proposed. As the amount of the yttrium oxide to be added, 1.3 to 4 mol- % is given, which can be replaced entirely or partially by the other stabilizing oxides in an amount of 0.01 to 12 mol- %.

In EP-A-236,507 there is described a zirconium dioxide containing more than 65% of tetragonal phase, which is contained in a high-density ceramic body consisting of 60 to 99 mol-% of aluminum oxide. To stabilize the zirconium oxide, less than 3 mol-% of $Y_2O_3$, less than 12 mol-% of MgO or CaO and less than 14 mol-% of $CeO_2$, with respect to the ceramic composition, are proposed. To improve sinterability and suppress grain growth and thus achieve an especially high density the material also contains transition metal oxides of Mn, Fe, Co, Ni, Cu and Zn, which can be added to the starting composition as such or as hydroxides, nitrates, chlorides, and the like. In this known material it is disadvantageous that it has a maximum hardness of 1,750 kg/mm$^2$ which is insufficient for many applications, especially in cutting tools for machining operations.

The addition of chromium oxide to aluminum oxide, using at least 10 wt-% of chromium oxide, has been proposed in U.S. Pat. No. 4,823,359 for the manufacture of a refractory material. Alternatively, a mixture consisting of aluminum oxide/zirconium dioxide can be used instead of the aluminum oxide. From the allowed size of the grains of up to 50 μm before sintering it is possible to infer the relatively great porosity and low toughness desired for refractory products. The use of stabilizing oxides and the presence of the zirconium dioxide used in some cases in a specific modification is not mentioned. Also according to U.S. Pat. No. 4,792,538, chromium dioxide together with aluminum oxide and zirconium dioxide is used for the production of refractory products. The amount of the chromium oxide in this case is around 5 to 25 wt-%, and preferably 16 wt-% is used. The porosity here is in the range of about 14 to 15%; the addition of stabilizing oxides and the presence of zirconium dioxide in a specific modification is not addressed.

WO 90/11980 relates to a ceramic in which plate-like grains of strontium aluminate in a molar ratio of $SrO:Al_2O_3$ between 0.02 and 0.2 are deposited into a matrix of $ZrO_2$, $Al_2O_3$, or a mixture of $Al_2O_3$ and $ZrO_2$. The hardnesses achieved are also relatively low at higher aluminum oxide contents.

The problem still exists of improving the known materials and to make available sintered moldings which have a high strength level and in which good toughness is combined with great hardness. The invention is aimed at making available a sintered molding which will satisfy these requirements, and due to its range of properties will have greater resistance to wear, so that the sintered molding will be suitable as a cutting tool, especially as a cutting insert, and quite especially as a cutting insert for the machining of cast-iron and steel materials, while an additional objective is seen in proposing a sintered molding which can be used as a cutting insert for interrupted cutting.

It has now been found that the solution of the problem in question requires a sintered molding with an entirely special composition. In addition to the transformation toughening, which is achieved by embedding in a ceramic matrix a zirconium dioxide containing stabilizing oxides, the invention, in accordance with a first embodiment, provides as the matrix a mixed crystal of aluminum oxide/chromium oxide. Furthermore, the invention provides that the zirconium dioxide embedded in the matrix, and the chromium oxide forming the mixed crystal with the aluminum oxide, are in a specific molar ratio to one another. This measure makes it possible for the first time to achieve hardness values such as have not previously been achieved at such zirconium dioxide contents, even at the relatively high zirconium dioxide contents which may be necessary to obtain an especially good toughness. On the other hand, at low zirconium dioxide contents, relatively low chromium oxide contents can be present, thereby counteracting the embrittlement of the material. According to its first embodiment the invention therefore proposes a sintering material in accordance with claim 1 for the solution of the stated problem.

The statement that the zirconium dioxide and chromium oxide containing the stabilizing oxides are to be present in a specific molar ratio necessarily also implies specific ratios for the rest of the components, because for example as the zirconium dioxide content decreases, the contents of the stabilizing oxides also decrease with respect to the sintered moldings, while on the other hand the content of the aluminum oxide increases. With respect to the aluminum oxide in the sintered molding, the chromium oxide is present in a weight ratio of 0.004 to 6.57% by weight, but it must not be overlooked that chromium oxide and the zirconium dioxide containing the stabilizing oxides are in the stated molar ratio. Of the stabilizing oxides, cerium oxide has proven to be the one that is very especially preferred.

In an additional advantageous embodiment, the content of the matrix material in the sintered molding amounts to at least 70% by volume, and is formed from an aluminum oxide/chromium oxide mixed crystal with a chromium oxide content of 0.01 to 2.32 wt-% with respect to aluminum oxide, while 2 to 30 vol.-% of zirconium dioxide is deposited in the matrix and the zirconium dioxide contains 0.27 to 2.85 mol-% of yttrium oxide with respect to the mixture of zirconium dioxide and yttrium oxide, and the zirconium dioxide is present in an average grain size not exceeding 2 μm, predominantly in the tetragonal modification. An amount of 0.27 to 2.85 mol-% of yttrium oxide, with respect to the mixture of zirconium dioxide and yttrium oxide, corresponds to 0.5 to 5.4 wt-% of yttrium oxide with respect to zirconium dioxide. In a sintered molding of this kind there is a molar ratio of 370:1 to 34:1 between chromium oxide and the zirconium dioxide containing the yttrium oxide.

In another especially preferred embodiment of the invention, the matrix material consists of an aluminum oxide/chromium oxide mixed crystal and of an additional mixed crystal of the formula $SrAl_{12-x}Cr_xO_{19}$, x having a value of 0.0007 to 0.045. In this embodiment too, which otherwise is the same as the first embodiment, a toughness-improving effect is produced by the zirconium dioxide embedded in the mixed crystal matrix, while the addition of chromium can counteract the loss of hardness caused by the zirconium dioxide content. The mixed crystal additionally formed by the addition of strontium oxide and having the formula $SrAl_{12-x}$—$Cr_xO_{19}$ has the additional effect that it gives the sintered molding a further improved toughness even at relatively high temperature. The wear resistance of these sintered moldings is therefore also improved under the effect of elevated temperature. Cerium oxide has proven to be especially suited in this embodiment as well.

The term, "mixed crystal," used in the claims and description, is not to be understood in the sense of monocrystal. Instead, it means a solid solution of chromium oxide in aluminum oxide and in strontium aluminate. The sintered molding in accordance with the invention is polycrystalline.

In another embodiment, the wear resistance of the sintered moldings can be improved by embedding 2 to 25 vol.-% of one or more carbides, nitrides or carbonitrides of metals of Groups 4b and 5b of the periodic system of the elements—with respect to the matrix material. Preferably the content of these hard substances is around 6 to 15% by volume. Particularly suitable are titanium nitride, titanium carbide and titanium carbonitride.

According to an especially preferred additional embodiment of the invention, the molar ratio of chromium oxide to the zirconium dioxide containing the stabilizing oxides is adjusted according to the zirconium dioxide content present in the sintered moldings such that, at low zirconium dioxide contents, low chromium oxide contents are present. Very especially a setting of the molar ratio of zirconium dioxide to chromium oxide has proven effective which is in the following range:

2 to 5 vol- % zirconium dioxide 1,000:1 to 100:1
>5–15 vol- % zirconium dioxide 200:1 to 40:1
>15–30 vol- % zirconium dioxide 100:1 to 20:1
>30–40 vol- % zirconium dioxide 40:1 to 20:1.

In order to have the zirconium dioxide established predominantly in the tetragonal modification it is necessary in accordance with the invention to establish a zirconium dioxide grain size not exceeding 2 μm. In addition to the allowed contents of zirconium dioxide in the cubic modification up to an amount of 5 vol- %, small amounts of the monoclinic modification are also allowed, but they too are not to exceed a maximum amount of 5 vol- %, and are preferably less than 2 vol- %, and it is very especially preferred that they be less than 1 vol- %, so that preferably more than 90 vol- % is present in the tetragonal modification.

Since, in addition to the components specified in the claims, the sintered molding also contains impurities which have inevitably crept in and which, according to an additional preferred embodiment of the invention, do not amount to more than 0.5 vol- %, the sintered molding consists only of the aluminum oxide/chromium oxide mixed crystal or of that mixed crystal and the mixed crystal of the formula $SrAl_{12-x}Cr_xO_{19}$ and of the zirconium dioxide containing the stabilizing oxides and incorporated into the matrix of the said mixed crystals. Additional phases, such as grain boundary phases which are formed when aluminum oxide and magnesium oxide are used together, or other crystalline phases such as those which form in the case of the additions of substances known from the state of the art, such as $YNbO_4$ or $YTaO_4$, which do not have a sufficiently high softening point, are not present in the sintered moldings in accordance with the invention. Also, the oxides of Mn, Cu, Fe, known from the state of the art, which also result in the formation of additional phases, result in a lowered softening point and have poor edge strength. The use of these materials is therefore excluded in the invention.

Preferably the zirconium dioxide is present in an amount of not more than 30 vol- %. Preferably the zirconium dioxide is not present in an amount of less than 15 vol- %. If between 15 and 30 vol- % of zirconium dioxide is present, the molar ratio between the chromium oxide and the zirconium dioxide containing the stabilizing oxides is very especially preferred between 40:1 and 25:1.

According to another very especially preferred embodiment, the content of the zirconium dioxide present in tetragonal modification amounts to more than 95 vol- %, while a total of only up to 5 vol- % is in the cubic and/or monoclinic modification. It is very especially preferred to have the grain size of the embedded zirconium dioxide in the range from 0.2 to 1.5 μm. On the other hand, an average grain size of the aluminum oxide/chromium oxide mixed crystal ranging from 0.8 to 1.5 μm has proven especially appropriate. If carbides, nitrides and carbonitrides of the metals of groups 4a and 5a of the Periodic Table are used, they are used in a grain size of 0.8 to 3 μm. The grains of the mixed crystal of the formula $SrAl_{12-x}Cr_xO_{19}$ have a length-to-thickness ratio in the range from 5:1 to 15:1. Their maximum length amounts to 12 μm, their maximum thickness to 1.5 μm.

The Vickers hardness of the sintered moldings in accordance with the invention is greater than 1,750 [$HVO_{0.5}$], but is preferably greater than 1,800 [$HVO_{0.5}$].

The microstructure of the sintered moldings in accordance with the invention is free of microcracks and has a porosity of not more than 1.0%. The sintered molding can also contain whiskers, but not silicon carbide whiskers.

The sintered molding contains none of the substances often used as grain growth inhibitors, such as magnesium oxide, for example.

During sintering, the stabilizer oxides dissolve in the $ZrO_2$ lattice and stabilize its tetragonal modification. For the preparation of the sintered moldings and to achieve a structure free of any other undesired phases, i.e., aluminum oxide and zirconium dioxide with a purity of more than 99%. Preferably the percentage of impurities is even substantially less. Silicon dioxide contents of more than 0.5% of the volume of the finished sintered moldings are especially undesirable. Excepted from this rule is the inevitable presence of hafnium oxide in a small amount of up to 2 wt- % within the zirconium dioxide.

The sintered molding in accordance with the invention is made by pressureless sintering or hot pressing a mixture of aluminum oxide/zirconium dioxide/chromium oxide and stabilizing oxides or a mixture of these components is used to which also strontium oxide and/or one or more nitrides, carbides and carbonitrides of groups 4a and 5a of the Periodic Table are added. The addition of yttrium oxide and chromium oxide can also be made in the form of yttrium chromium oxide ($YCrO_3$), while the addition of strontium oxide can be made in the form of strontium salts, especially strontium carbonate ($SrCO_3$). The term, "pressureless sintering," as used herein, includes both sintering under atmospheric conditions and under shielding gas, or in vacuo. Preferably the molding is first presintered without pressure to 90 to 95% of the theoretical density, and then subjected to a hot isostatic pressing or gas pressure sintering. The theoretical density can thus be increased to a level of more than 99.5%.

Applications of the sintered molding preferably lie in its use as a cutting tool for cutting paper, textiles and films, but especially preferred is the use of the sintered molding as a cutting insert for the machining of cast iron or of steel materials, especially interrupted cutting. By this is meant that many small, smooth cuts are performed successively on the workpiece, and the cutting insert becomes very hot while it is in engagement with the workpiece and cools briefly before the next engagement, so that the insert is subjected to alternating thermal stress.

The following examples will serve to explain the invention.

EXAMPLES 1 TO 18 AND EXAMPLES FOR COMPARISON

Different ceramic mixtures were prepared by milling. A temporary binding agent was added to the ground mixtures which were then spray-dried. Then green moldings were pressed from the spray-dried mixtures and were either sintered without pressure or presintered and subjected to a gas pressure sintering process under argon. In Table 1 are listed the calculated compositions of the sintered moldings.

The matrix content in percentage by volume in the last horizontal column in Table 1 includes all percentages of the composition in question with the exception of the zirconium dioxide and the stabilizing oxides.

In Table 2 are listed the results of the testing of the examples of Table 1.

In the tables:
A: indicates pressureless sintering
B: indicates pressureless presintering followed by gas-pressure sintering under argon.
D: indicates percentage density in comparison to the theoretical density.

E: indicates elasticity modulus $\sigma_{4B}$: indicates flexural strength, measured by the 4-point method (DIN 51110)

$K_{ic}$: indicates toughness $HV_{0.5}$: indicates Vickers hardness, measured according to DIN 50113

$\sigma_{3B 200° C.}$: indicates flexural strength at 1200° C., measured by the 3-point method.

$\sigma_{3B\ RT}$: indicates flexural strength at room temperature, measured by the 3-point method (for comparison to the flexural strength $\sigma_{3B\ 1200° C.}$):

BRIEF DESCRIPTION OF THE DRAWINGS

FIG. 2 shows the result of a test on a commercialized cutting insert in which tetragonal zirconium dioxide is embedded in an aluminum oxide matrix with the simultaneous use of magnesium oxide.

FIG. 3 corresponds to Example 11 and FIG. 4 to Example 12.

In FIGS. 2 to 4,

Ck 45=Steel material vc: =Cutting speed f: Feed ap: =Cutting depth

ASB: =Time at which break-outs are not larger than the width of the wear marks.

Figure 1:
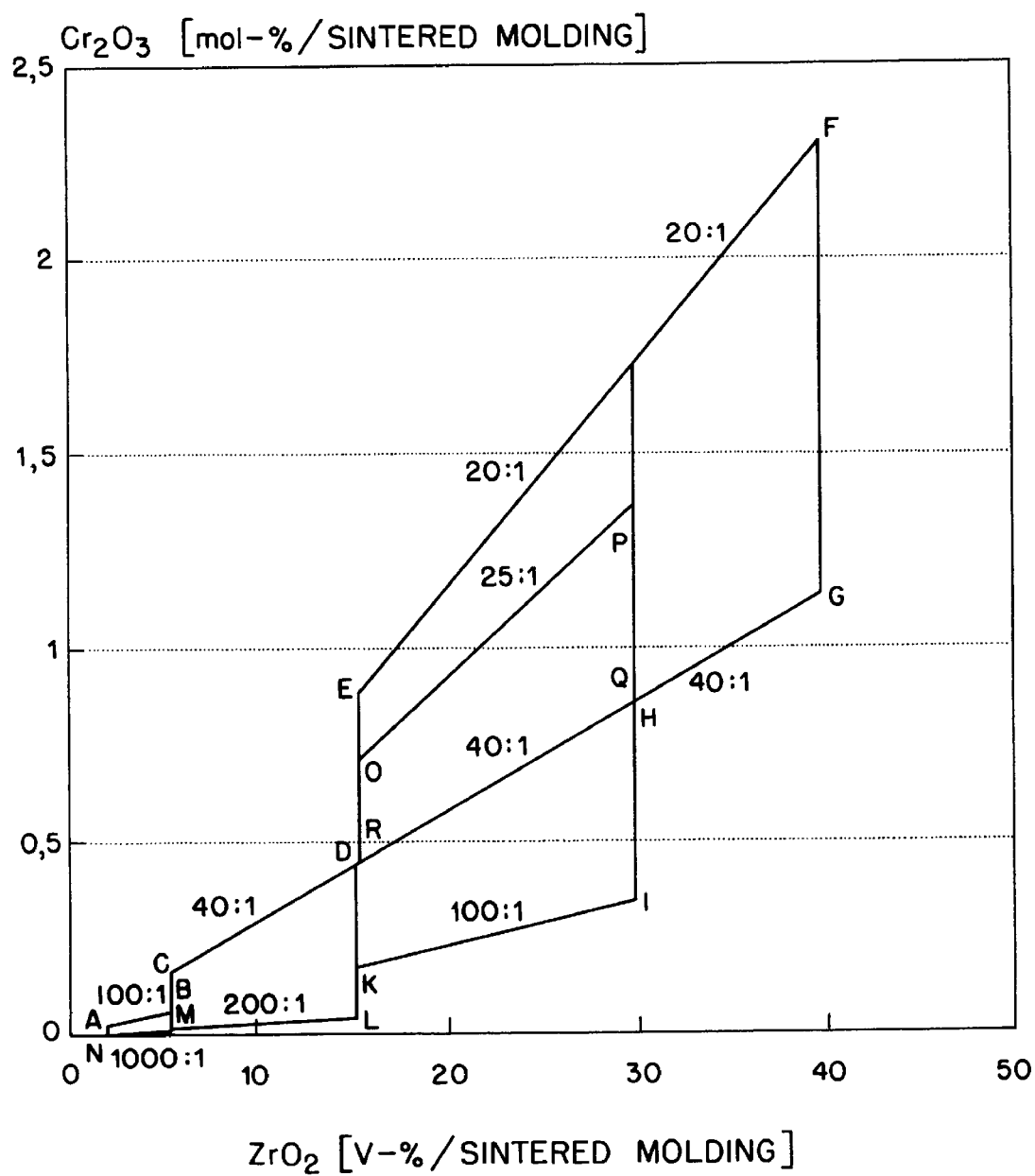
FIG. 1 is a graphic representation of the molar ratio of $ZrO_2:Cr_2O_3$ that is to be established preferably according to the present invention, which corresponds to a surface defined by the points A, B, C, D, E, F, G, H, I, K, L, J and N. According to a very especially preferred embodiment of the invention, in which the zirconium dioxide is present in an amount of 15 to 30% by volume, the molar ratio between zirconium dioxide and chromium oxide is determined by the area that is defined by the quadrangle with the points O, P, R and Q.
Figure 2:
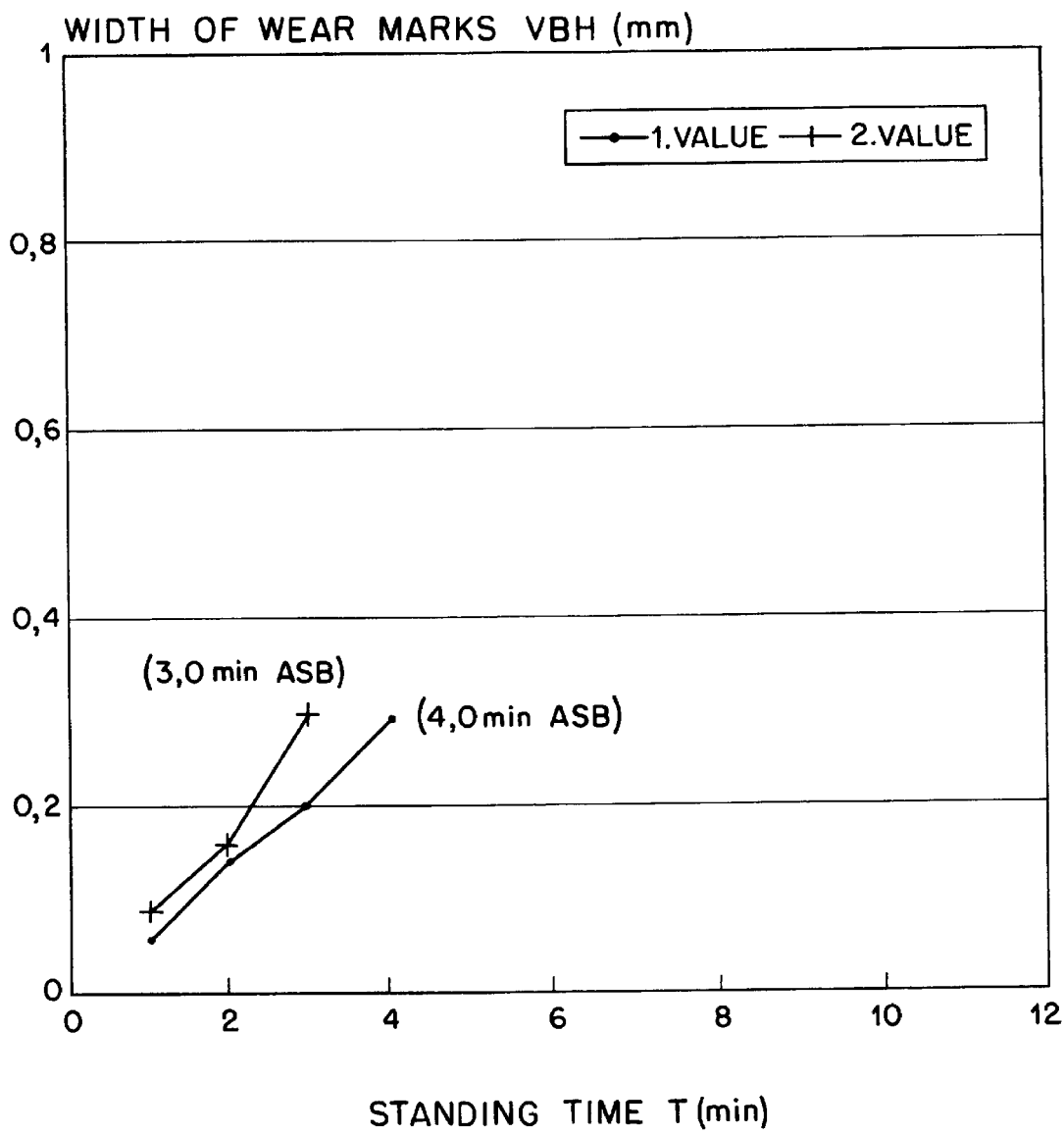
FIGS. 2, 3 and 4 are graphic representations of the results of a fluctuating-temperature test of a cutter insert.
Figure 3:
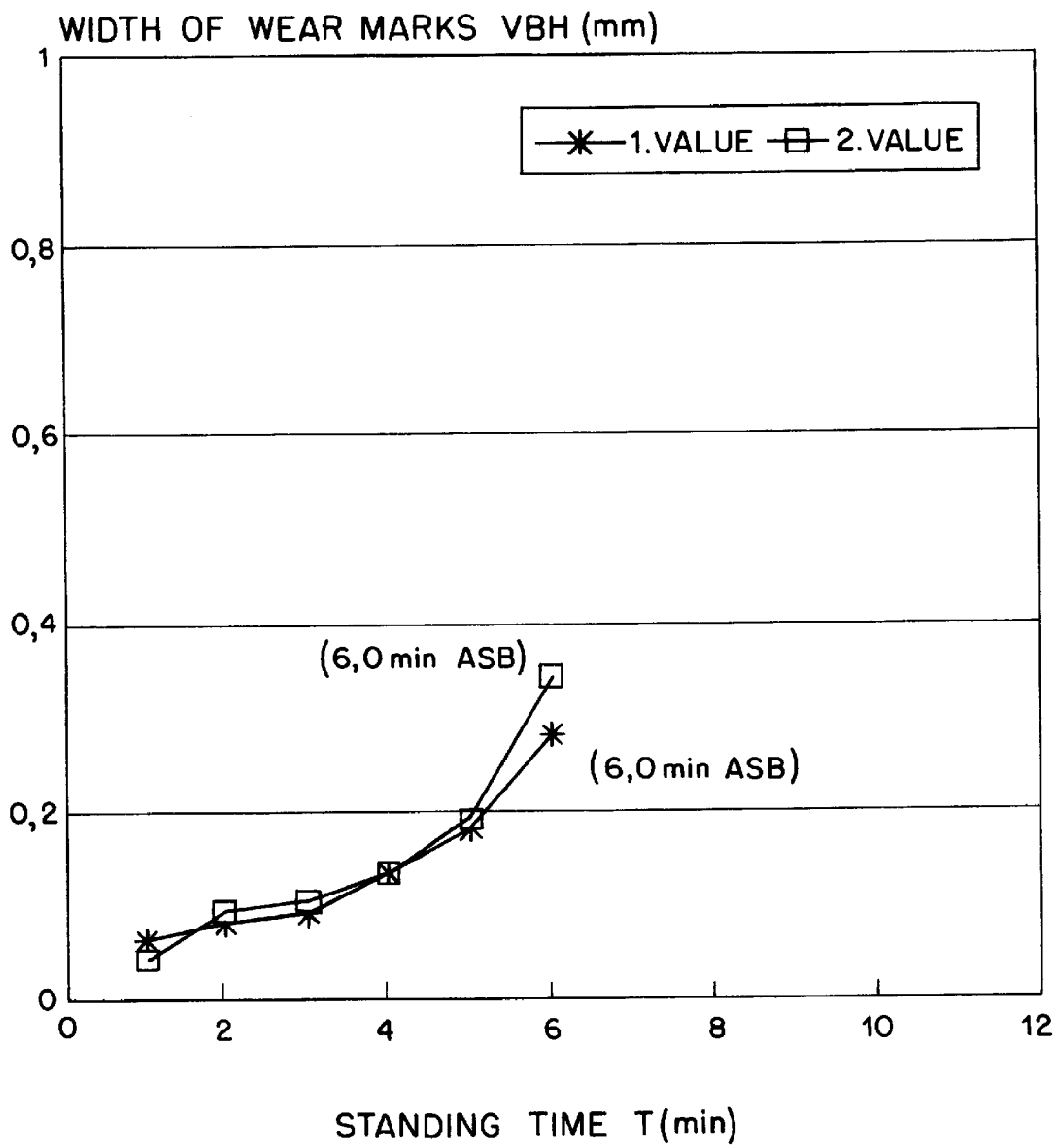
Figure 4:
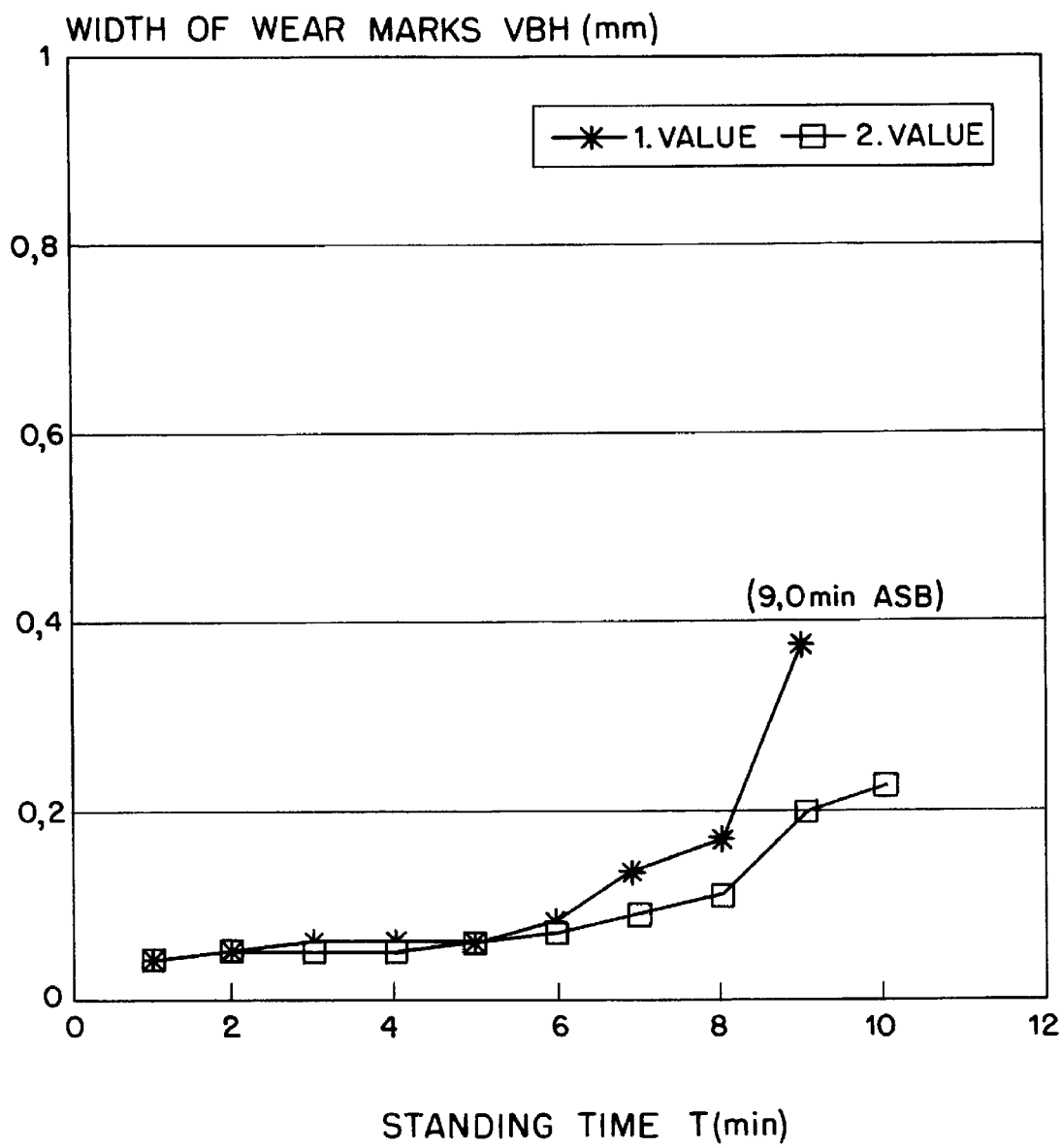

The results to be seen in FIGS. 3 and 4 prove the considerably improved wear resistance of sintered moldings if they are used in accordance with the present invention as cutter inserts, in comparison with known standard cutter inserts.

Figure 5:
Figure 6:
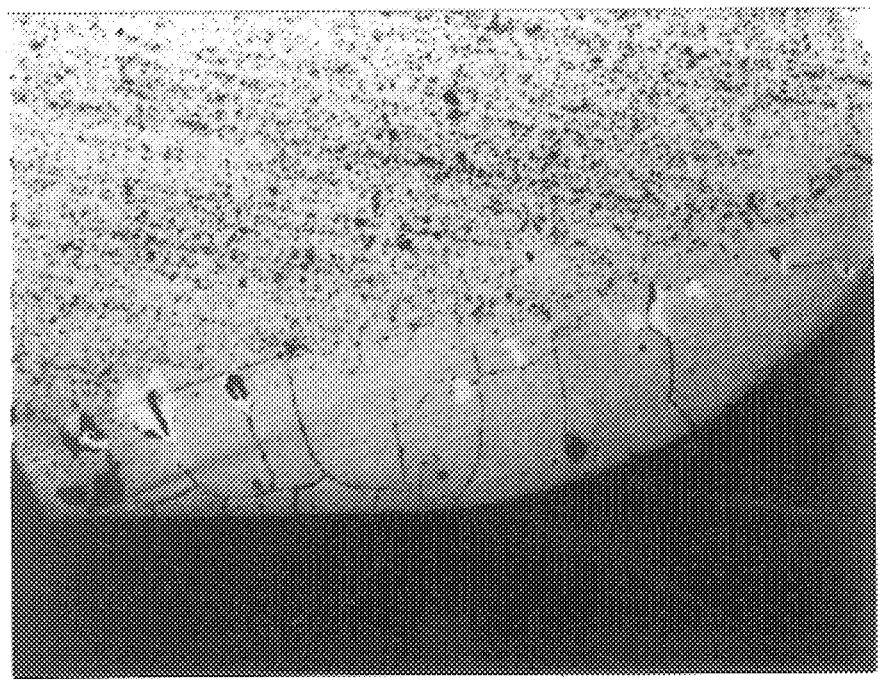
Figure 7:
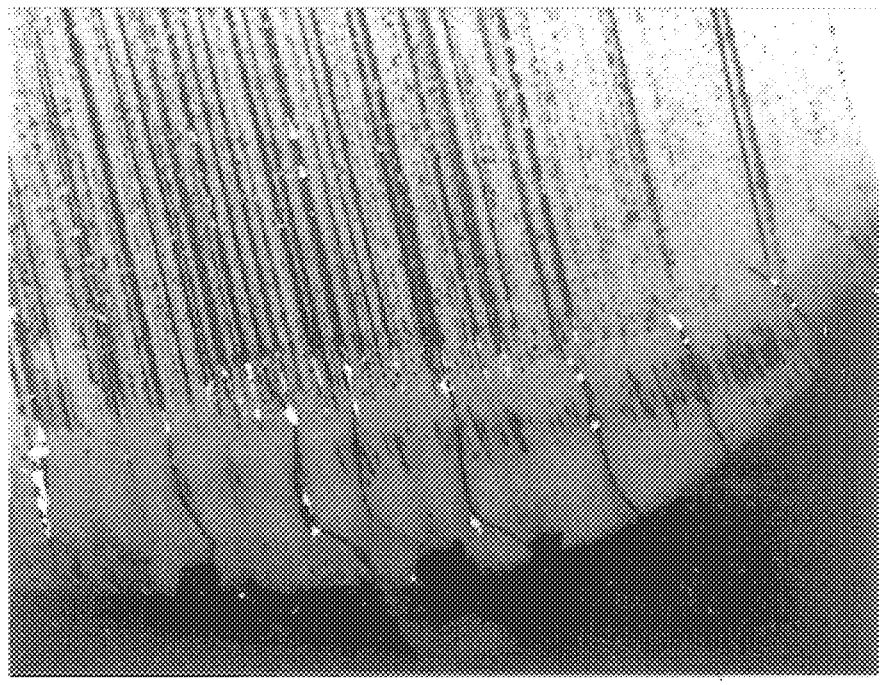

FIGS. 5, 6 and 7 are photomicrographs of cutter insert edges after the alternating heat test described in connection with FIGS. 2 to 4, and FIGS. 5 and 6 show the state after a period of engagement of 4 minutes, and FIG. 7 after 10 minutes. FIG. 5 corresponds to Example 2, FIG. 6 to Example 10, and FIG. 7 to Example 12.

While FIGS. 5 and 6 show the formation of a few longitudinal cracks and indications of the occurrence of transverse cracks, the occurrence of transverse cracks cannot be seen in FIG. 7. From this it can be concluded that an especially good and practical wear resistance has been achieved, even when temperature fluctuations occur, because spontaneous break-outs are prevented, thereby considerably improving reliability in the cutting process. Although FIG. 6 indicates the comparatively greatest formation of transverse cracking, the results of the testing of Example 10 on which FIG. 6 is based show an enormously great toughness combined with great hardness and flexural strength, so that sintered moldings of this material are outstandingly suited for machining operations at slightly lower alternating temperature stresses in comparison to the previously described alternating temperature tests.

TABLE 1

| | wt.-% | | | | | | | | | | | |
| --- | --- | --- | --- | --- | --- | --- | --- | --- | --- | --- | --- | --- |
| | C.Ex. 1 | C.Ex. 2 | Ex. 1 | Ex. 2 | Ex. 3 | Ex. 4 | Ex. 5 | Ex. 6 | Ex. 7 | Ex. 8 | Ex. 9 | Ex. 10 |
| $Al_2O_3$ | 75 | 73.52 | 74.13 | 74.13 | 64.4 | 64.4 | 63.80 | 94.93 | 74.1 | 74.1 | 64.1 | 64.1 |
| $Cr_2O_3$ | — | — | 0.87 | 0.87 | 0.59 | 0.59 | 1.22 | 0.05 | 0.9 | 0.9 | 0.9 | 0.9 |
| SrO | — | — | — | — | — | — | — | — | — | — | — | — |
| $ZrO_2$ | 23.7 | 23.67 | 23.7 | 23.7 | 34.1 | 34.1 | 33.15 | 4.76 | 21.0 | 21.0 | 29.4 | 29.4 |
| $Y_2O_3$ | 1.3 | 1.29 | 1.3 | 1.3 | 0.91 | 0.91 | 1.83 | 0.26 | — | — | — | — |
| $CeO_2$ | — | — | — | — | — | — | — | — | 4.0 | 4.0 | 5.6 | 5.6 |
| $Pr_2O_3$ | — | — | — | — | — | — | — | — | — | — | — | — |
| TiN | — | — | — | — | — | — | — | — | — | — | — | — |
| $Nb_2O_4$ | — | 1.52 | — | — | — | — | — | — | — | — | — | — |
| Sintering process | A | B | A | B | A | B | B | B | A | B | A | B |
| Vol-% of matrix | 81.7 | 81.7 | 81.6 | 81.6 | 73.5 | 73.5 | 73.3 | 96.6 | 82.2 | 82.2 | 74.1 | 74.1 |

| | Ex. 11 | Ex. 12 | Ex. 13 | Ex. 14 | Ex. 15 | Ex. 16 | Ex. 17 | Ex. 18 |
| --- | --- | --- | --- | --- | --- | --- | --- | --- |
| $Al_2O_3$ | 73.53 | 73.53 | 58.68 | 73.80 | 85 | 67.13 | 74.42 | 63.8 |
| $Cr_2O_6$ | 0.86 | 0.86 | 1.20 | 0.40 | 0.10 | 0.87 | 0.55 | 0.79 |
| SrO | 0.79 | 0.79 | 0.12 | 0.8 | 4.69 | 0.69 | — | 0.64 |
| $ZrO_2$ | 23.53 | 23.53 | 38.20 | 23.21 | 8.58 | 23.70 | 18.33 | 29.21 |
| $Y_2O_3$ | 1.29 | 1.29 | 1.80 | 0.11 | — | 1.30 | — | — |
| $CeO_2$ | — | — | — | 1.68 | 1.63 | — | — | 5.56 |
| $Pr_2O_3$ | — | — | — | — | — | — | 6.70 | — |
| TiN | — | — | — | — | — | 6.31 | — | — |
| $Nb_2O_5$ | — | — | — | — | — | — | — | — |
| Sintering process | A | B | B | B | B | B | B | B |
| Vol-% of matrix | 81.8 | 81.8 | 69 | 82 | 93.1 | 81.3 | 82.4 | 74.3 |

TABLE 2

|  | C.Ex. 1 | C.Ex. 2 | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| D (%) | 99.1 | 99.5 | 99.3 | 99.8 | 98.0 | 99.1 | 99.7 | 100.0 | 99.6 | 100 |
| E (GPa) | 341 | 334 | 353 | 355 | 327 | 333 | 348 | 389 | 336 | 352 |
| $\sigma_{4B}$ (MPa) | 563 | 511 | 572 | 689 | 613 | 720 | 829 | 464 | 691 | 812 |
| $K_{1c}$ (MPa$\sqrt{m}$) | 4.92 | 5.81 | 5.4 | 6.1 | 6.5 | 6.8 | 5.7 | 4.4 | 6.6 | 7.3 |
| $HV_{0.5}$ | 1692 | 1561 | 1990 | 2045 | 1771 | 1955 | 2021 | 2102 | 1892 | 1952 |
| $\sigma_{3B\ RT}$ |  |  |  |  |  |  |  |  |  |  |
| $\sigma_{3B\ 1200°\ C.}$ |  |  |  | 430 |  | 362 |  |  |  | 505 |

|  | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| D (%) | 98.1 | 99.5 | 99.3 | 99.8 | 99.5 | 99.7 | 99.8 | 99.7 | 99.6 | 99.7 |
| E (GPa) | 326 | 335 | 339 | 338 | 317 | 342 | 363 | 374 | 342 | 319 |
| $\sigma_{4B}$ (MPa) | 572 | 680 | 474 | 575 | 807 | 793 | 627 | 617 | 584 | — |
| $K_{1c}$ (MPa m) | 6.7 | 11.3 | 5.8 | 4.8 | 7.1 | 6.4 | 6.1 | 6.0 | 5.7 | 15.7 |
| $HV_{0.5}$ | 1860 | 1821 | 1829 | 1951 | 1827 | 1927 | 1948 | 2067 | 1897 | 1830 |
| $\sigma_{3B\ RT}$ |  | 998 | — | 897 |  |  |  |  |  |  |
| $\sigma_{3B\ 1200°\ C.}$ |  | 645 | — | 400 |  |  |  |  |  |  |

It will be understood that the specification and examples are illustrative but not limitative of the present invention and that other embodiments within the spirit and scope of the invention will suggest themselves to those skilled in the art.

We claim:

1. A sintered molding comprising:

a) 60 to 98 vol.- % of a matrix material formed from an aluminum oxide/chromium oxide mixed crystal, b) 2 to 40 vol.- % of zirconium dioxide embedded in the matrix material and containing c) as stabilizing oxides more than 10 to 15 mol.- % of one or more of the oxides of cerium, praseodymium and terbium and/or 0.2 to 3.5 mol.- % of yttrium oxide, with respect to the mixture of zirconium dioxide and stabilizing oxides, d) the added amount of the stabilizing oxides being so chosen that the zirconium dioxide is present predominantly in the tetragonal modification and e) the molar ratio between the zirconium dioxide containing the stabilizing oxides and the chromium oxide amounting to 370:1 to 34:1, f) the amounts of all components making up 100% by volume, g) and the zirconium dioxide having a grain size not exceeding 2 μm.

2. The sintered molding according to claim 1, made of:

a) at least 70 vol.- % of a matrix material formed from an aluminum oxide/chromium oxide mixed crystal with a chromium oxide content of 0.01 to 2.32 wt.- % with respect to aluminum oxide, b) 2 to 30 vol.- % of zirconium dioxide embedded in the matrix, and c) containing 0.27 to 2.85 mol- % of yttrium oxide with respect to the mixture of zirconium dioxide and yttrium oxide, d) the zirconium dioxide being present in an average grain size not exceeding 2 μm, predominantly in the tetragonal modification.

3. A sintered molding comprising:

a1) 60 to 98 vol.- % of a matrix material, the latter consisting of a2) 67.1 to 99.2 vol.- % of an alumium oxide/chromium oxide mixed crystal a3) 0.8 to 32.9 vol.- % of a mixed crystal of the formula $SrAl_{12-x}Cr_xO_{19}$, x corresponding to a value of 0.0007 to 0.045, b) 2 to 40 vol.- % of zirconium dioxide incorporated into the matrix material, which c) contains as stabilizing oxides more than 10 to 15 mol.- % of one or more of the oxides of cerium, praseodymium and terbium and/or 0.2 to 3.5 mol.- % of yttrium oxide, with respect to the mixture of zirconium dioxide and stabilizing oxides, d) the added amount of the stabilizing oxides being chosen such that the zirconium dioxide is present predominantly in the tetragonal modification, and e) the molar ratio between the zirconium dioxide containing the stabilizing oxide and the chromium oxide amounting to 1,000:1 to 20:1, f) the portions of the components making up 100 vol.- % of the sintered molding, and g) the zirconium dioxide has a grain size not exceeding 2 μm.

4. The sintered molding of claim 3, wherein the matrix material additionally contains 2 to 25 vol- % of one or more of the carbides, nitrides and carbonitrides of the metals of the Group IVB and VB of the Periodic Table of Elements—with respect to the matrix material.

5. The sintered molding of claims 3 or 4, with a molar ratio of the zirconium dioxide containing the stabilizing oxides to the chromium oxide in the range of 2–5 vol- % zirconium dioxide 1,000:1–100:1
   >5–15 vol- % zirconium dioxide 200:1–40:1
   >15–30 vol- % zirconium dioxide 100:1–20:1
   >30–40 vol- % zirconium dioxide 40:1–20:1.

6. The sintered molding of claim 1, with an amount of zirconium dioxide not greater than 30 vol- %.

7. The sintered molding of claim 1, wherein the zirconium dioxide has the tetragonal modification to at least 95 vol- %.

8. The sintered molding of claim 1, wherein the total zirconium dioxide content is present in the cubic and/or monoclinic modification of 0 to 5 vol- %.

9. The sintered molding of claim 1, with an average grain size of the aluminum oxide/chromium oxide mixed crystal of 0.8 to 1.5 μm.

10. The sintered molding of claim 1, with a grain size of the zirconium dioxide between 0.2 and 1.5 μm.

11. The sintered molding of claim 1, with not more than 0.5 mol- % of unavoidable impurities, with respect to the sintered molding.

12. The sintered molding of claim 1, with a Vickers hardness (Hv 0.51)>1,800.

* * * * *

UNITED STATES PATENT AND TRADEMARK OFFICE
CERTIFICATE OF CORRECTION

PATENT NO. : 5,830,816
DATED : Nov. 3, 1998
INVENTOR(S) : Burger, et al.

It is certified that error appears in the above-identified patent and that said Letters Patent is hereby corrected as shown below:

Column 7, line 7, change "3B200°" to -- 3B1200° --.

Signed and Sealed this

Fourth Day of July, 2000

Attest:

Q. TODD DICKINSON

Attesting Officer

Director of Patents and Trademarks